Dec. 4, 1962   J. C. MOBLEY   3,066,443
WILD LIFE CALLER
Filed Dec. 12, 1961

INVENTOR
JOHN C. MOBLEY,
BY John Gibson Semmes
ATTORNEY

United States Patent Office 3,066,443
Patented Dec. 4, 1962

3,066,443
WILD LIFE CALLER
John C. Mobley, 618 Linden Ave., Portsmouth, Va.
Filed Dec. 12, 1961, Ser. No. 158,810
4 Claims. (Cl. 46—177)

The present invention relates to wild fowl callers, particularly a caller embodying both reed and whistle call components.

This application is a continuation-in-part of applicant's application Serial No. 44,809, now Patent No. 3,029,554, for Wild Life Caller, filed July 22, 1960.

In the parent application there was presented the combination in a wild life caller of a reed component and a whistle component which was movable against the reed to lock same while calling through the whistle. The present improvement consists in the simplification of both components, the stationary supporting of the whistle piece in the caller body and the provision of depresser means for selectively locking the reed during whistle calling. According to the present invention, a reed support piece is positioned within the air discharge exit of the caller body and the reed is held within the caller body above a bifurcated portion of the support piece which defines an air discharge channel. Also, according to the present invention, the simplified construction of both reed support and whistle components permit stationary positioning of the whistle piece in the caller body and above the reed with the result that both whistle and reed components may be easily manipulated for selective reed or whistle call.

Accordingly, it is an object of invention to provide a wild life caller having both reed and whistle call components of improved construction.

Another object of invention is to provide a wild life caller of simplified construction wherein either reed or whistle call components may be used without repositioning of these components within the caller body.

Yet additional objects of invention will become apparent from the ensuing specification and attached drawing wherein.

Figure 7:
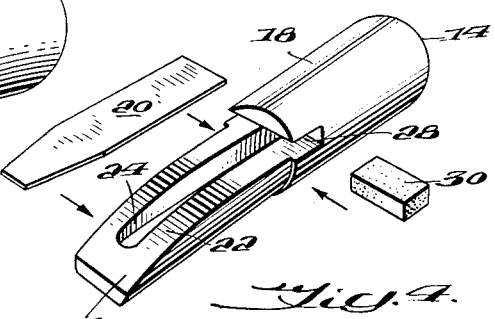
Figure 2:
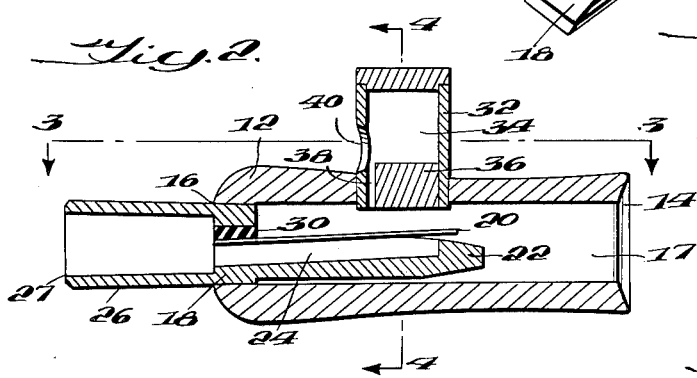
FIG. 2 is a longitudinal cross-section of said caller, showing reed 20 supported within the caller air chamber and beneath the whistle piece 32.
Figure 4:
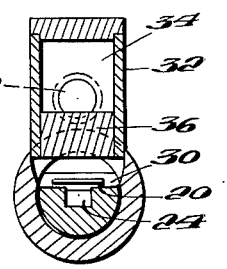
Figure 3:
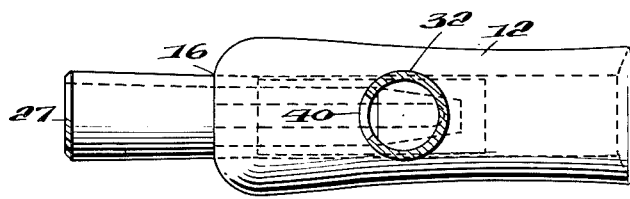
FIG. 3 is a top plan thereof.
Figure 6:
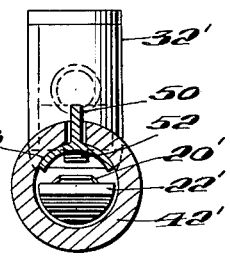
Figure 5:
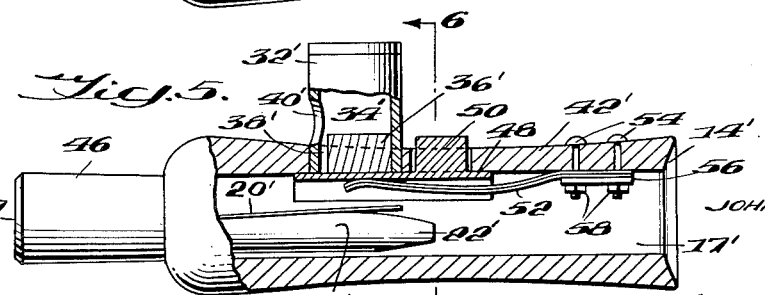

FIG. 4 is a vertical section taken along section line 4—4 of FIG. 2 and showing the reed 20 supported above the bifurcated portion of the reed support piece defining air exit channel 24;

FIG. 5 is a perspective partially in longitudinal section, showing a modification of invention wherein depressor piece 50 is spring urged to close the whistle air entry channel 38 for reed calling, and is depressable to lock reed 20' against the support shoulder 18' for whistle calling; and FIG. 6 is a vertical section taken along section line 6—6 of FIG. 5;

FIG. 7 is an enlarged exploded perspective of the bifurcated reed support shoulder insertable within the air discharge exit of the caller body.

Figure 1:
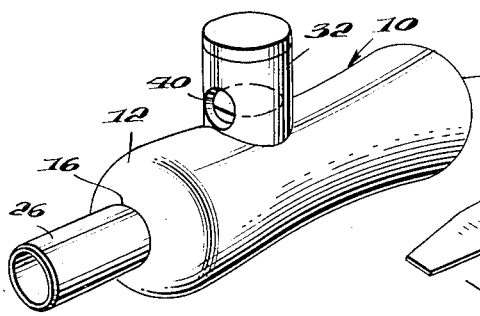
FIG. 1 is a perspective of a wild life caller embodying a reed component longitudinally supported within the caller body and a whistle component permanently positioned in the top of the caller body.

In FIG. 1 wild life caller 10 is shown as embodying caller body 12 having air entry port 14 and air discharge exit 16. Whistle calling piece 32 includes whistle chamber 34, closure plug 36 and whistle air entry channel 38 interconnecting air chamber 17 and whistle chamber 34. Whistle exit aperture 40 is positioned above the top of caller body 12. Reed support piece 18 having an interior bore or horn portion 26 and a bifurcated shoulder portion 22 defining air exit channel 24 is supported within air discharge exit 16 so that the horn 26 is presented exteriorly of the caller and reed 20 is presented longitudinally of the caller interior and beneath whistle piece 32. Reed 20 may be constructed of plastic, flexible metal or the like and is supported above the whistle shoulder by means of cork, plastic or resilient spline 30 fitting within lateral cross-cut 28.

The reed call is most effectively used by closing whistle exit aperture 40 by means of the forefinger or the like and blowing through air entry port 14. Whistle call is effected by closing of the horn 26 discharge aperture 27. In the modified wild life caller, illustrated in FIGS. 5 and 6, whistle support piece 32' is identically constructed to that illustrated in FIGS. 1 through 4 embodying plug 36', whistle air entry channel 38', leading to whistle chamber 34' and whistle exit aperture 40' presented above the caller body 42' which is of a somewhat elongated configuration. Reed 20' may be presented longitudinally within air chamber 17' by means of reed support piece 18' embodying bifurcated shoulder 22'.

Whistle depressor 48, having an arcuate cross-section complemental to the interior of the caller body, has an index piece 50 which protrudes through the top of the caller body 42'. Depressor 48 is urged against whistle piece 32' so as to close whistle air entry channel 38' by means of leaf spring 52. Leaf spring 52 is supported within the caller body by bolts 54, retainer plate 56 and nuts 58. Whistling through the modified device is accomplished by depression of depressor 48 so as to lock reed 20' against shoulder 22' and simultaneously opening whistle entry aperture 38'.

Manifestly, various changes in construction of the device and positioning of the whistle and reed call components may be employed without departing from the spirit and scope of invention, as defined in the subjoined claims.

I claim:

1. A water fowl caller comprising a body, including an air chamber with air entry port and air discharge exit; a reed support extending through said discharge exit of said air chamber and including a horn portion extending beyond said exit and a reed support shoulder presented interiorly of said air chamber and a reed longitudinally positioned above said reed support shoulder; a whistle piece mounted in said body above said reed and including a whistle chamber, a whistle air entry channel interconnecting said air chamber and said whistle chamber and a whistle exit aperture presented above said caller body; and a reed depressor piece including a depressor portion extending longitudinally within said air chamber and supported against said whistle air entry channel by spring means, said depressor portion being movable against said reed to lock said reed against said shoulder in whistle call position and urged by said spring means against said whistle air entry channel to whistle closed position, thus releasing said reed for actuation by air.

2. A wild life caller as in claim 1, said whistle depressor piece being complementally configured to the interior of said air chamber.

3. A wild life caller as in claim 1, said reed support shoulder being bifurcated so as to define an air exit channel beneath said reed and interconnecting said air chamber and said horn portion.

4. A wild life caller as in claim 3, said depressor having an index piece extending through the top of said body.

References Cited in the file of this patent
UNITED STATES PATENTS
2,396,359    Yager ------------------ Mar. 12, 1946